March 24, 1959

P. R. WEAVER 2,879,053

ACCELEROMETER

Filed Nov. 1, 1956

INVENTOR
PRESTON R. WEAVER
BY
Moses, Nolte + Nolte.
ATTORNEYS.

March 24, 1959
P. R. WEAVER
2,879,053
ACCELEROMETER
Filed Nov. 1, 1956
3 Sheets-Sheet 2
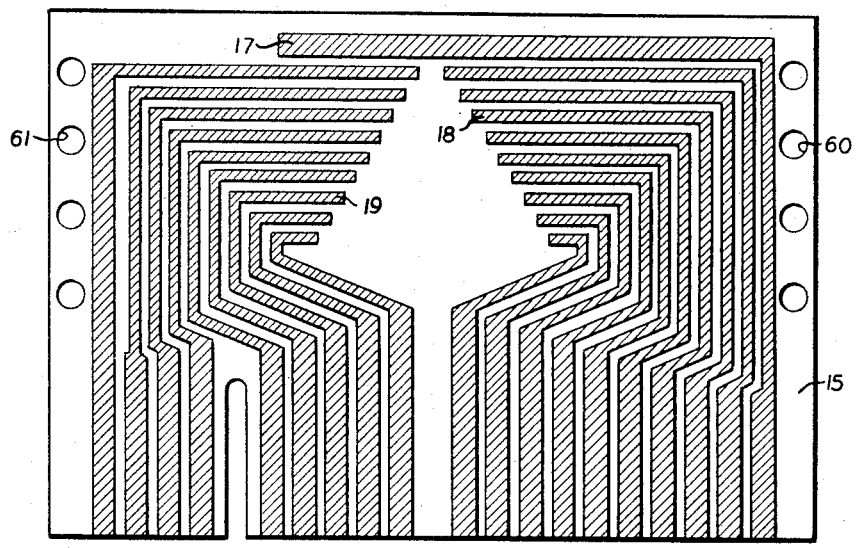
FIG. 2.
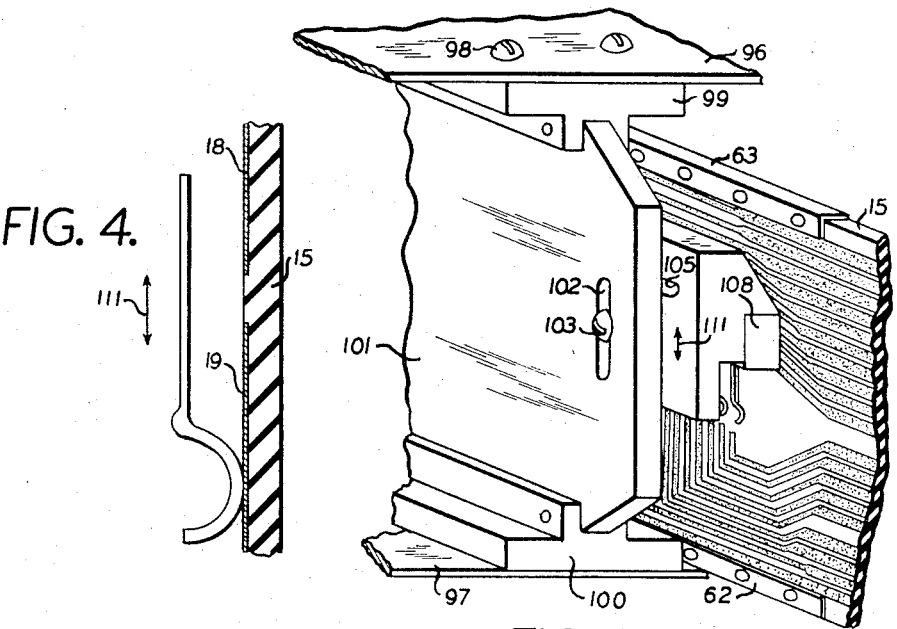
FIG. 4.
FIG. 3.
INVENTOR
PRESTON R. WEAVER
BY
Moses, Nolte + Nolte
ATTORNEYS.

March 24, 1959 P. R. WEAVER 2,879,053
ACCELEROMETER
Filed Nov. 1, 1956 3 Sheets-Sheet 3

INVENTOR
PRESTON R. WEAVER
BY
Moses, Nolte + Nolte.
ATTORNEYS.

though the filter 32 and relay 24 to the positive side
United States Patent Office

2,879,053
Patented Mar. 24, 1959

2,879,053

ACCELEROMETER

Preston R. Weaver, Nyack, N.Y., assignor to The W. L. Maxson Corporation, New York, N.Y., a corporation of New York Application November 1, 1956, Serial No. 619,805

11 Claims. (Cl. 264—1)

This invention relates to an accelerometer and more particularly to an accelerometer for measuring and recording the number of occurrences of accelerations equal to or in excess of a plurality of predetermined values.

An object of the invention is to record or register the number of occurrences of predetermined positive as well as negative accelerations.

Another object of the invention is to measure and record the number of positive and negative accelerations occurring along one axis without a response to high frequency fluctuations of the acceleration superimposed upon the primary waves of acceleration.

Another object of the invention is to provide an accelerometer which is capable of responding reliably to very rapid accelerations.

A still further object of the invention is to provide an accelerometer in which the sensing elements can be readily adjusted to adjust the values of the predetermined accelerations to be measured.

Still another object of the invention is to provide an accelerometer in which the acceleration responsive means is rugged and stable and consequently free of the errors which occur in like instruments using micro switches or other delicate devices.

The invention will be fully understood and other objects and advantages thereof will become apparent from the following description and the drawings in which:

Fig. 2 is a plan view of the contact board;

Fig. 3 is a perspective view of the acceleration sensing elements;

Fig. 4 is a view of one of the wipers and a cross section of a portion of the contact board.

Figure 1:
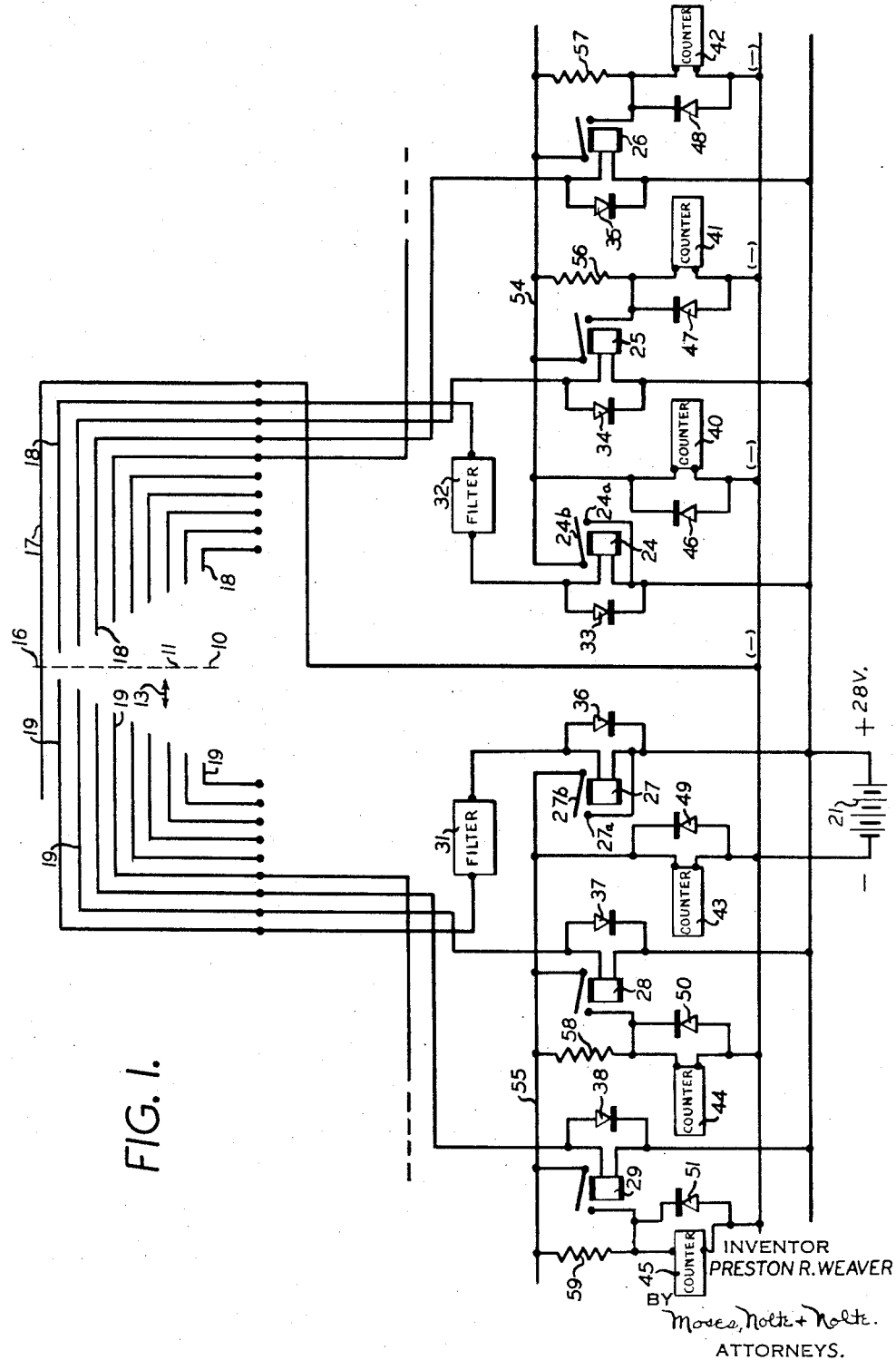
Fig. 1 is a circuit diagram of an embodiment of the invention.
Figure 5:
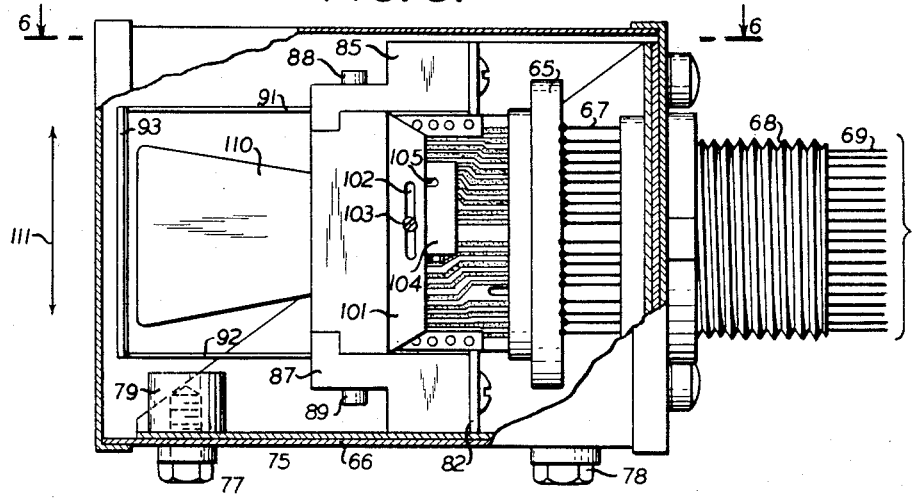
Fig. 5 is a front view of the accelerometer with a portion of the casing broken away.
Figure 6:
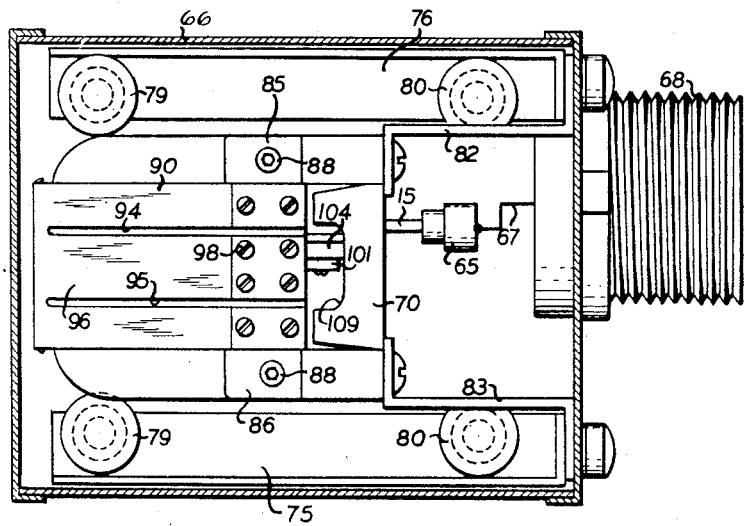
Fig. 6 is a sectional view taken along the line 6—6 of Fig. 5.

Referring to the drawing, the acceleration sensing element is a wiper assembly 10 having a plurality of individual contact means or wipers 11. In response to a positive or negative acceleration, wiper assembly 10 is adapted to move in one direction or the other as indicated by the double arrow 13. The wipers 11 move over and in engagement with a contact board 15. Contact board 15 may be formed of any suitable insulating material, such as glass, and is provided on one surface thereof with a plurality of conductive strips which may be arranged as shown in Fig. 2. The uppermost wiper 16, which may actually comprise two wiper elements, is adapted to remain in contact with the uppermost conductive strip 17 throughout its excursions in both directions. The individual wipers 11 and 16 are interconnected so that the entire wiper assembly 10 remains in electrical contact with the uppermost conductive strip 17. The remaining conductive strips 18 and 19 terminate at varying distances from the normal position of wiper assembly 10 and on either side thereof. Thus, as the wiper assembly is deflected by increasingly greater accelerations, it engages an increasing number of either conductive strips 18 or 19.

Conductive strip 17 serves as a buss which extends to one side of a suitable power supply 21, which may be the 28 volt D.C. power supply of an airplane, for example. The other conductive strips 18 and 19 have leads extending to relays 24, 25 and 26 and relays 27, 28, 29 respectively. While only three relays of each set are shown, it will be understood that generally a much larger number will be used and will be connected to the remaining strips 18 and 19. Uppermost conductive strips 18, 19 are connected to their respective relays 24 and 27 through filters 31 and 32 which are adapted to prevent the radiation of noise that might interfere with the operation of nearby communication equipment. Each relay is shunted by a suitable diode rectifier 33—38, which may be selenium diodes, to protect the sensing elements from high transient currents. Relay 24, for example, has a pair of contacts 24a and 24b adapted to connect a suitable electrically operated counter 40 across the power supply 21. Counter 40 is shunted by a reversely poled diode 46. The remaining counters 41—45 are similarly connected to the contacts of relays 25—29 and through them to the battery 21, and these counters are similarly shunted by diodes 47—51. It will be seen that upon closure of the contacts 24a, 24b of relay 24 or contacts 27a and 27b of relay 27, the positive side of voltage source 21 will be extended to leads 54 or 55 and then through resistors 56—59 to counters 41 and 42 or 44 and 45. However, resistors 56—59 are large enough to prevent the counters from operating. Operation of relays 25, 26, 28 and 29 causes these resistors to be short-circuited and the full voltage of the source 21 to be applied to the counters, thereby triggering them to an operating condition in a manner which will be described in greater detail later.

The operation of the circuit as so far described, is as follows: The wiper assembly 10 is mounted so that it will move to the right in response to a (say) positive acceleration and to the left in response to a negative acceleration as indicated by the double arrow 13. All the wipers are connected together and the uppermost wiper 16 remains permanently in engagement with conductive strip 17, so that the entire wiper assembly is connected at all times to the negative side of voltage source 21. When an acceleration occurs which moves the wiper assembly to the right, the uppermost wiper 11 will engage the uppermost conductive strip 18 and complete a circuit through filter 32 and relay 24 to the positive side of voltage source 21. This will cause relay 24 to close its contacts 24a and 24b. Closure of these contacts supplies voltage to the lead 54 and impresses the voltage of source 21 directly across the counter 40. Counter 40, as well as the other similar counters, may be of any of the well known types adapted to be cocked to a counting condition in response to a predetermined current and thereafter register or add a single count upon the termination of the applied current. Such counters may consist essentially of the well known decade mechanical counters of the Veeder Root type having a solenoid for operating them.

Closure of contacts 24a and 24b also apply a voltage through conductor 54 and resistors 56 and 57 to counters 41 and 42. Resistors 56 and 57 are of a sufficient size, however, to reduce the current therethrough to a value which is incapable of producing operation of counters 41 and 42. The result, therefore, of an acceleration sufficient to move the wiper 10 to the uppermost or first right-hand conductive strip 18 is to cock only counter 40 to the counting position. If the acceleration thereafter falls to the reference level and the wiper 10 returns to its normal position, thereby breaking contact with conductive strip 18, relay 24 is de-energized and contacts 24a and 24b are opened. This removes the voltage from counter 40 and this counter is operated from its cocked position to register a count. On the other hand, if the acceleration should continue to increase, instead of returning to the reference level, it would eventually come into contact with the second and third conductive strips 18 and cause operation of relays 25 and 26. Closure of the contacts of these relays would shunt out resistors 56 and 57 successively and cause counter 41, and thereafter counter 42, to be energized to their cocked positions, counter 40, of course, being also in the same condition. Now, if the acceleration should decrease so that the wiper leaves the conductive strip connected to relay 26, this relay would open and place resistor 57 in circuit with counter 42. However, once a counter such as counter 42 is in its cocked position, the reduced current flowing through resistor 57 will be sufficient to hold it in this condition, for as is well known, the holding voltage of a solenoid, is much less than its operating voltage or current. It will be evident then, that all operated relays will remain in their cocked position until the acceleration decreases below a value at which the wiper leaves the uppermost conductive strip 18 and thereby de-energizes relay 24 to remove the voltage from lead 54. When this occurs, all of the relays which have been placed in a cocked position operate to register the count. If the wiper, after reaching a position corresponding to the closing of relay 26, say, should in response to fluctuations in the acceleration, leave the conductive strip associated with relay 26 and thereafter re-engage it one or more times, this would have no effect on counter 42. In other words, each counter will register or add a count of one during each primary wave of acceleration which reaches the predetermined value corresponding to that counter and will be unaffected by fluctuations of the accelerations which may be superimposed on the primary wave of acceleration. The counters therefore provide information as to the number of positive and negative primary acceleration waves which reach each of the predetermined levels represented by the various counters.

Contact plate 15, shown in Fig. 2, may consist of a small plate of insulating material having a plurality of conductive strips embedded in one face of the contact plate. Contact plate may be formed by etching it in the pattern shown and then filling the etched portion with a conductive material. The plate may then be finished by polishing so that the contact plate 15 will present a smooth surface to the wipers adapted to travel thereover. It can be seen in Fig. 2 that conductive strips 17, 18 and 19 are in alignment and extend parallel to each other in the direction of travel of the wipers. Along both sides of the contact plates, holes 60 and 61 may be provided for the attachment of suitable mounting brackets 62 and 63, shown in Fig. 3. In one particular embodiment of the invention, the contact plate was formed of glass and had a thickness of about 1/16", a width of about 2" and a height of about 1¼".

Contact plate 15 is fixed to a connector 65 which is suitably mounted in the casing 66. A plurality of leads 67 extend from the contacts of connector 65 to an external connector 68. Connector 68 is adapted to make connection with a plurality of leads 69 extending to the apparatus shown at the bottom of Fig. 1. The inner end of contact board 15 may also be supported if desired between a pair of plates 70.

A pair of side brackets 75 and 76 are fixed to casing 66 by screws 77 and 78 and nuts 79 and 80. From the vertical sides of brackets 75 and 76, there extend a pair of Z-shaped brackets 82 and 83. Brackets 82 and 83 support a rectangular frame comprising the members 70 and a pair of end members 85 and 86 and a similar pair of members 87. A C-shaped spring 90 is attached to members 85, 86 and 87 by screws 88 and 89. Spring 90 has upper and lower arms 91 and 92 and a connecting portion 93. The upper and lower arms 91 and 92 of spring 90 are provided with long narrow slots 94 and 95, which extend nearly to the middle portion 93 of the spring. The slots thus define middle spring portions 96 which support the wiper assembly. The outer ends of spring members 96 are connected by screws 98 to slotted plates 99 and 100 (Fig. 3) which support a vertical plate 101 therebetween. Vertical plate 101 is provided with a vertical slot 102 through which a screw 103 extends into a wiper holding plate 104 so that plate 104 may be adjusted vertically with respect to plate 101 by moving screw 103 in slot 102. Plate 104 is provided with a similar slot 105 extending horizontally. Through slot 105 one or more screws (not shown) extend into the wiper holding bar 108 to permit the horizontal adjustment of the wipers with respect to plate 104. Thus horizontal and vertical adjustment of the wipers are provided. Wipers 11 and 16 are mounted on supporting bar 108 and are interconnected electrically. In order to dampen oscillation of spring assembly 90, a magnet 110 is positioned within the spring assembly. The poles of the magnet are at opposite sides of conductive plate 101, so that the latter is in the field of magnet 110. Movement of plate 101 will cause eddy currents therein resulting in damping the movement of plate 101. Plates 70 are cut out at 109 to permit movement of wiper supporting plate 101. Arrow 111 indicates the direction of movement of the wipers.

It will be clear from the description given above that if an acceleration occurs in the upward or downward directions as indicated by arrow 111, the outer ends of springs 96 will be deflected and will carry the wiper assembly 10 upward or downward into contact with one or more of conductive strips 18 and 19 on contact plate 15. This will cause one or more of counters 40—45 to be cocked. The counters will thereafter be held in a cocked position by the holding current extending through contacts 24a, 24b or 27a, 27b, leads 54 or 55 and resistors 56, 57 or 58 and 59. This condition will persist until the wipers, in response to a decrease of the acceleration, leave conductive strips 18 and 19, thereby de-energizing relays 24 or 27 and breaking the holding circuit for the counters. The counters thereupon release and register their counts. If the acceleration, after reaching a given level and causing a given counter to be cocked, should fall to a lower lever, greater than the first level, the given counter would be held in its cocked condition by the holding circuit, so that the fluctuation of the acceleration would have no effect on the counter.

I have described what I believe to be the best embodiments of my invention. I do not wish, however, to be confined to the embodiments shown, but what I desire to cover by Letters Patent is set forth in the appended claims.

What I claim is:

1. An accelerometer for counting the number of times each of a plurality of predetermined accelerations have occurred, comprising a source of voltage; a plurality of counting means, a plurality of relay means each adapted to connect one of said counting means in series with said source of voltage for operating the counting means; acceleration responsive means for connecting the relay means across the source of voltage successively in response to successively greater respective predetermined accelerations; said acceleration responsive means including a contact board having a plurality of contacts individually connected to said relay means, contact means movable relative to said contact board in response to an acceleration so as to engage and remain in engagement with all of said contacts on said board corresponding to predetermined values which are less than or equal to said acceleration, said contact means being connected to said source of voltage; and means for holding the counting means in a cocked position until the acceleration decreases to a reference level and thereupon releasing the counting means to enable the operated counting mans to register counts, whereby the number of accelerations rising from the reference level to each of the predetermined values is counted and fluctuations of the acceleration which are wholly above the reference level are not counted.

2. An accelerometer according to claim 1, wherein said contact board includes a plurality of conductive parallel strips located on one side of said contact means and extending in the direction of the acceleration to be measured, said contact means including a plurality of interconnected wipers and means for resiliently mounting said wipers for movement in the direction of and along said strips in response to an acceleration.

3. An accelerometer according to claim 1, wherein said counting means are arranged in two series, said acceleration responsive means being connected to energize the counting means in one of said series in response to an acceleration in one direction and to energize the counting means in the other series in response to an acceleration in the opposite direction.

4. An accelerometer according to claim 3, wherein said contact board includes a plurality of conductive parallel strips located on one side of said contact means and a second plurality of conductive parallel strips located on the opposite side of said contact means, said conductive strips extending in the direction of the accelerations to be measured, said contact means including a plurality of interconnected wipers and means for resiliently mounting said wipers for movement in the direction of and along said strips in response to an acceleration.

5. An accelerometer according to claim 4, wherein said contact board includes on conductive strip which extends continuously across said contact board on both sides of said contact means so as to be continuously in contact with one of said wipers, said last named conductive strip being connected to one side of the voltage source.

6. An accelerometer according to claim 1, wherein said acceleration responsive means is arranged to maintain said relays energized as long as the acceleration remains in excess of the respective predetermined values corresponding to said relays.

7. An accelerometer for counting the number of times each of a plurality of predetermined accelerations have occurred comprising a source of voltage; a sequence of counting means; a plurality of relay means each adapted to connect one of said counting means in series with said source of voltage for operating the counting means; acceleration responsive means connected to said relay means for energizing said relay means successively in response to said predetermined accelerations; said acceleration responsive means including a contact board having a sequence of contacts individually connected to successive ones of said relay means, resiliently mounted contact means movable relative to said contact board in response to an acceleration so as to engage and remain in engagement with all of said contacts on said board corresponding to predetermined values which are less than or equal to the acceleration; and means for holding the counting means in a cocked position until the acceleration decreases to a reference level and thereupon releasing the counting means to enable the operated counting means to register counts, whereby the number of accelerations rising from the reference level to each of the predetermined values is counted and fluctuations of the acceleration between said predetermined values are not counted.

8. An accelerometer for counting the number of times each of a plurality of predetermined accelerations have occurred comprising a source of voltage; a plurality of counting means arranged in two series, a plurality of relay means each arranged to connect one of said counting means in series with said source of voltage for operating the counting means, acceleration responsive means for energizing the relay means in one of said series successively in response to predetermined accelerations in one direction and for energizing the relay means in the other series successively in response to predetermined accelerations in the opposite direction, and means for holding the counting means in a cocked position until the acceleration decreases to a reference level and thereupon releasing the counting means to enable the cocked counting means to register counts, whereby the number of accelerations rising from the reference level to each of the predetermined values is counted and fluctuations of the acceleration between said predetermined values are not counted.

9. An accelerometer for counting the number of times each of a plurality of predetermined accelerations have occurred comprising acceleration responsive switching means for producing a closure of a number of first contacts or second contacts, respectively, in response to an acceleration in one direction or the opposite direction, said first contacts and said second contacts being so arranged that the number of said contacts which are closed in response to an acceleration corresponds to the magnitude of the acceleration, and means connected to said switching means for counting the number of closures of contacts, wherein the last means comprises a counting circuit including a plurality of electrically operated counters, relay means responsive to the closing of said contacts to place successive ones of said counters in operative condition and maintain them in such condition until all relays have been de-energized, said counters including means for registering a count upon being de-energized after having been set to an operative condition.

10. An accelerometer for counting the number of times each of a plurality of predetermined accelerations have occurred comprising a source of voltage; a sequence of counting means; a plurality of relay means each adapted to connect one of said counting means in series with said source of voltage for operating the counting means; acceleration responsive means connected to said relay means for energizing said relay means successively in response to said predetermined accelerations; said acceleration responsive means including a contact board having a sequence of contacts individually connected to successive ones of said relay means, resiliently mounted contact means movable relative to said contact board in response to an acceleration so as to engage all of said contacts on said board corresponding to predetermined values which are less than or equal to the acceleration; and means for releasing the counting means to register counts, in response to a decrease of the acceleration to a reference level, whereby the number of accelerations rising from the reference level to each of the predetermined values is counted and fluctuations of the acceleration between said predetermined values are not counted.

11. An accelerometer for counting the number of times each of a plurality of predetermined accelerations have occurred comprising a source of voltage; a plurality of counting means, a plurality of relay means each arranged to connect one of said counting means in series with said source of voltage for operating the counting means, acceleration responsive means for energizing the relay means successively in response to predetermined accelerations, and means responsive to a decrease of the acceleration to a reference level for releasing the counting means to enable the counting means to register counts, whereby the number of accelerations rising from the reference level to each of the predetermined values is counted and fluctuations of the acceleration between said predetermined values are not counted.

(References on following page)

References Cited in the file of this patent

UNITED STATES PATENTS

| | | |
|---|---|---|
| 665,998 | Davis | Jan. 15, 1901 |
| 1,921,833 | McGorum | Aug. 8, 1933 |
| 2,034,649 | Brown | Mar. 17, 1936 |
| 2,311,637 | Buchanan | Feb. 23, 1943 |
| 2,386,777 | Bentley, Jr. | Oct. 16, 1945 |
| 2,547,199 | Dezzani | Apr. 3, 1951 |
| 2,629,030 | Taylor | Feb. 17, 1953 |
| 2,640,900 | Klose | June 2, 1953 |
| 2,641,457 | Carleton | June 9, 1953 |
| 2,702,186 | Head et al. | Feb. 15, 1955 |
| 2,733,116 | Fantham | Jan. 31, 1956 |